United States Patent
Boyd et al.

(10) Patent No.: US 6,514,451 B1
(45) Date of Patent: Feb. 4, 2003

(54) METHOD FOR PRODUCING PLASTIC CONTAINERS HAVING HIGH CRYSTALLINITY BASES

(75) Inventors: Timothy J. Boyd, Ypsilanti, MI (US); Kerry W. Silvers, Chelsea, MI (US); Dwayne G. Vailliencourt, Manchester, MI (US)

(73) Assignee: Schmalbach-Lubeca AG (DE)

( * ) Notice: Subject to any disclaimer, the term of this patent is extended or adjusted under 35 U.S.C. 154(b) by 4 days.

(21) Appl. No.: 09/609,306

(22) Filed: Jun. 30, 2000

(51) Int. Cl.[7] .............................................. B29C 49/64
(52) U.S. Cl. ...................... 264/521; 264/528; 264/900; 264/903; 264/904
(58) Field of Search ................................ 264/521, 900, 264/903, 904, 528

(56) References Cited

U.S. PATENT DOCUMENTS

| | | |
|---|---|---|
| 4,039,641 A | 8/1977 | Collins |
| 4,091,059 A | 5/1978 | Ryder |
| 4,151,250 A | 4/1979 | Barry et al. |
| 4,154,920 A | 5/1979 | Jabarin |
| 4,244,913 A | 1/1981 | Ryder |
| 4,264,558 A | 4/1981 | Jacobsen |
| 4,385,089 A | 5/1983 | Bonnebat et al. |
| 4,476,170 A | 10/1984 | Jabarin |
| 4,512,948 A | 4/1985 | Jabarin ........................ 264/521 |
| 4,522,779 A | 6/1985 | Jabarin |
| 4,790,741 A | 12/1988 | Takakusaki et al. |
| 4,850,850 A | 7/1989 | Takaausaki et al. |
| 4,863,046 A | 9/1989 | Collette et al. |
| 4,883,631 A | 11/1989 | Ajmera |
| 5,229,043 A * | 7/1993 | Lee .............................. 264/37 |
| 5,261,454 A | 11/1993 | Ota ................................ 215/1 |
| 5,908,128 A | 6/1999 | Krishnakumar et al. |

FOREIGN PATENT DOCUMENTS

| | | |
|---|---|---|
| JP | 59129125 A * | 7/1984 |
| WO | WO 94/26497 | 11/1994 |
| WO | WO 96/30190 | 10/1996 |

OTHER PUBLICATIONS

The Crystallization of Oriented Poly(ethyleneterephthalate), F.S. Smith and R.D Steward, CI Fibres, Hookstone Road, Harrogate, Yorkshire HG2 8QN, UK, Received May 15 1973; revised Jun. 26 1973.

The Crystallization of Poly(ethyleneterephthalate) and Related Copolymers, J.B. Jackson and F. W. Longman, Paper Presented at the SPE 27[27] Annual Technical Conference, Chicago, May 1969.

Crystallization and Thermal Stabilization of Heat Set PET, S.A. Jabarin, accepted for publication in the Polymeric Materials Encyclopedia.

* cited by examiner

*Primary Examiner*—Suzanne E. McDowell
(74) *Attorney, Agent, or Firm*—Harness, Dickey & Pierce, P.L.C.

(57) ABSTRACT

A method for producing a heat set plastic container including: providing a mold cavity having sidewall surfaces and base surfaces; providing a plastic preform within the mold cavity; expanding and stretching the preform into conformity with the sidewall surfaces and the base surfaces to form a plastic container having a sidewall and a base; and inducing crystallinity in the base of the plastic container by applying heat from the base surfaces of the mold cavity to the base of the plastic container and by applying heat from an interior portion of the plastic container to an interior surface of the base of the plastic container.

12 Claims, 7 Drawing Sheets

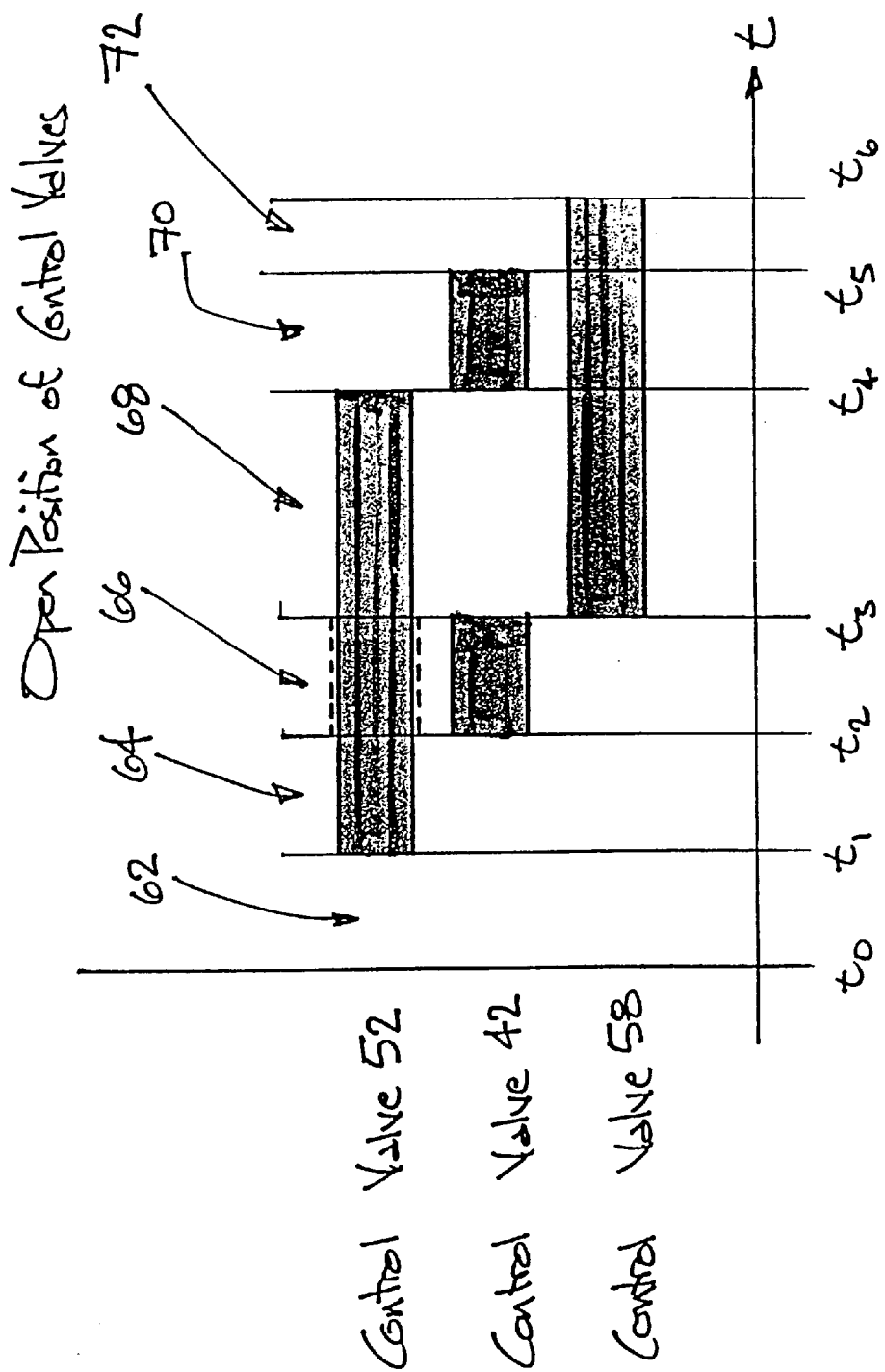

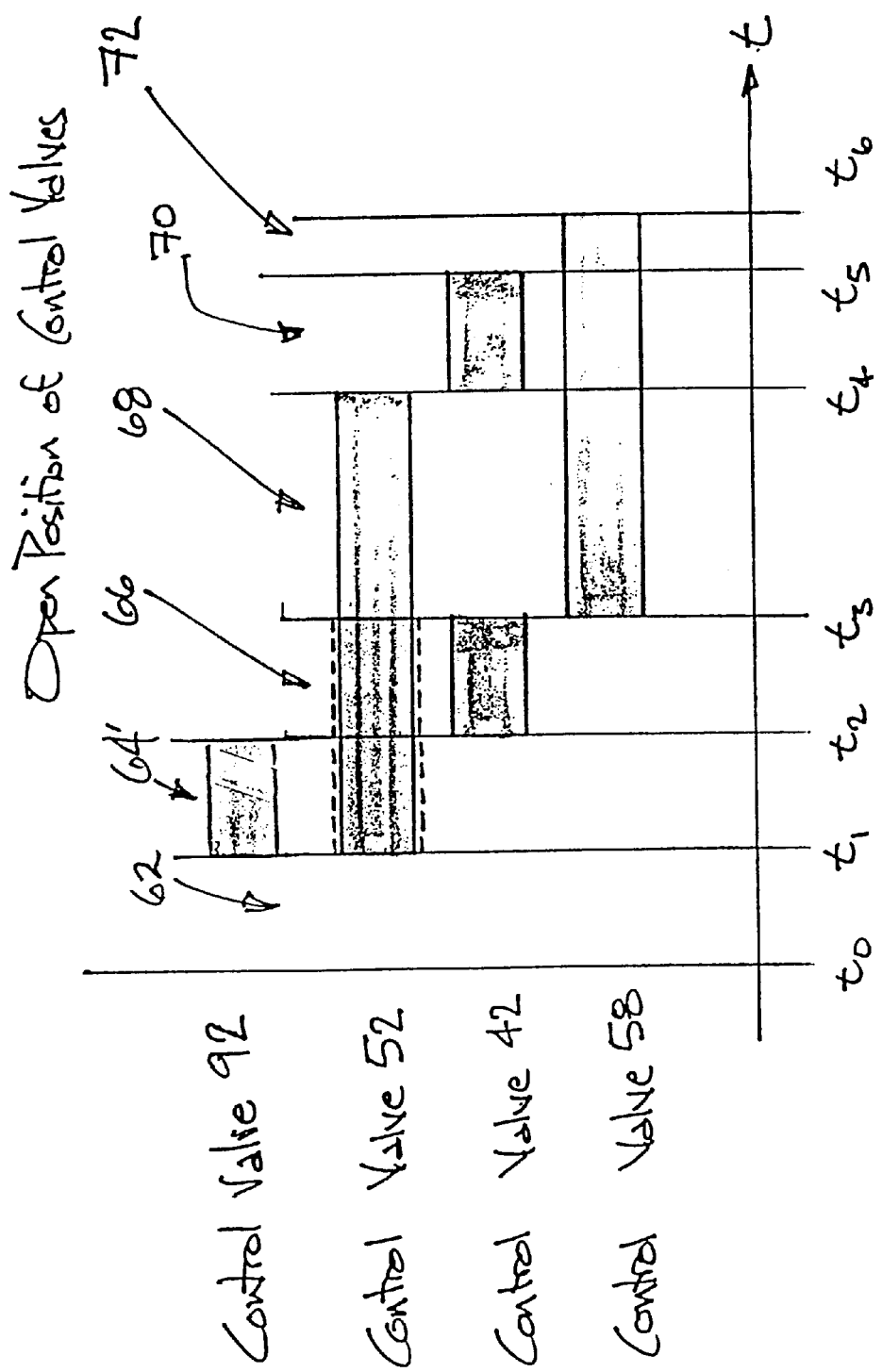

METHOD FOR PRODUCING PLASTIC CONTAINERS HAVING HIGH CRYSTALLINITY BASES

TECHNICAL FIELD OF THE INVENTION

This invention generally relates to blow molding methods for producing heat set plastic containers. More specifically, this invention relates to blow molding methods for producing biaxially oriented plastic containers with high crystallinity bases.

BACKGROUND

Recently, manufacturers of polyethylene terephthalate (PET) containers have begun to supply plastic containers for commodities that were previously packaged in glass containers. The manufacturers, as well as consumers, have recognized that PET containers are lightweight, inexpensive, recyclable, and manufacturable in large quantities. Manufacturers currently supply PET containers for various liquid commodities, such as juices. They also desire to supply PET containers for solid commodities, such as pickles. Many solid commodities, however, require pasteurization or retort, which presents an enormous challenge for manufactures of PET containers.

Pasteurization and retort are both methods for sterilizing the contents of a container after it has been filled. Both processes include the heating of the contents of the container to a specified temperature, usually above 70° C., for a duration of a specified length. Retort differs from pasteurization in that it also applies overpressure to the container. This overpressure is necessary because a hot water bath is often used and the overpressure keeps the water in liquid form above its boiling point temperature. These processes present technical challenges for manufactures of PET containers, since new pasteurizable and retortable PET containers for these commodities will have to perform above and beyond the current capabilities of conventional heat set containers. Quite simply, the PET containers of the current techniques in the art cannot be produced in an economical manner such that they maintain their material integrity during the thermal processing of pasteurization and retort.

PET is a crystallizable polymer, meaning that it is available in an amorphous form or a semi-crystalline form. The ability of a PET container to maintain its material integrity is related to the percentage of the PET container in crystalline form, also known as the "crystallinity" of the PET container. Crystallinity is characterized as a volume fraction by the equation:

$$\text{Crystallinity} = \frac{\rho - \rho_a}{\rho_c - \rho_a}$$

where $\rho$ is the density of the PET material; $\rho_a$ is the density of pure amorphous PET material (1.333 g/cc); and $\rho_c$ is the density of pure crystalline material (1.455 g/cc). The crystallinity of a PET container can be increased by mechanical processing and by thermal processing.

Mechanical processing involves orienting the amorphous material to achieve strain hardening. This processing commonly involves stretching a PET container along a longitudinal axis and expanding the PET container along a transverse axis. The combination promotes biaxial orientation. Manufacturers of PET bottles currently use mechanical processing to produce PET bottles having roughly 20% crystallinity (average sidewall crystallinity).

Because of the current design of molding machines and of plastic containers, the base of a typical plastic container does not undergo significant mechanical or thermal processing and is prone to deformation imparted if subjected to a high temperature hot fill process. Prior methods have involved either premolding or post molding operations to crystallize the base, both occurring outside the mold and requiring several minutes to complete.

Thus, the manufacturers of PET containers desire an efficient and inexpensive method that produces PET containers having high crystallinity bases, which allow the PET containers to maintain their material integrity during subsequent shipment and use of the PET containers. It is therefore an object of this invention to provide such a container that overcomes the problems and disadvantages of the conventional techniques in the art. Another object of the invention is to provide a method for in mold crystallization of a base.

SUMMARY OF THE INVENTION

Accordingly, this invention provides for a blow molding method that produces PET containers having average base crystallinities of at least 30%, which allow the PET containers to maintain their material integrity during any subsequent pasteurization or retort processes, and during shipment and use of the PET containers.

At its broadest, the invention is a method for producing a heat set plastic container including providing a mold cavity having sidewall surfaces and base surfaces; providing a plastic preform within the mold cavity; expanding and stretching the preform into conformity with the sidewall surfaces and the base surfaces to form a plastic container having a sidewall and a base; and inducing crystallinity in the base of the plastic container by applying heat from the base surfaces of the mold cavity to the base of the plastic container and by applying heat from an interior portion of the plastic container to an interior surface of the base of the plastic container.

Further features and advantages of the invention will become apparent from the following discussion and accompanying drawings.

BRIEF DESCRIPTION OF THE DRAWINGS

FIG. 5 is a timing chart for the control valves of the blow molding machine according to the blow molding method of the present invention;

FIG. 8 is a timing chart for the control valves of the blow molding machine of FIG. 7 according to an alternative blow molding method of the invention.

DETAILED DESCRIPTION OF THE PREFERRED EMBODIMENT

Figure 1:
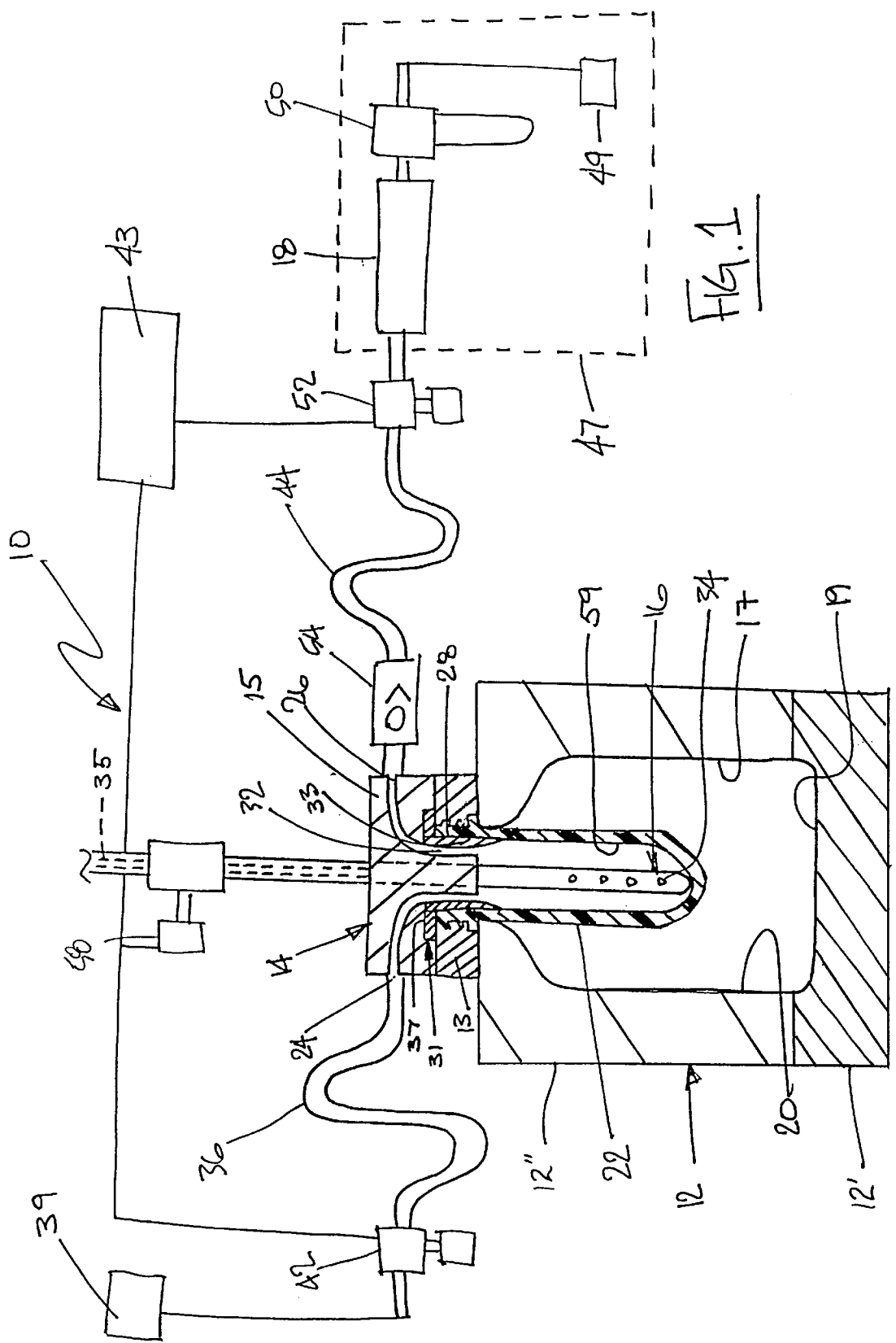
FIGS. 1–4 are schematic cross-sectional views of a portion of a blow molding machine during various stages and processes of the invention taken along a line generally bisecting the blow molding machine.

As shown in FIG. 1, the blow molding machine preferably used during the method of the present invention has a blow molding station 10 that generally includes a blow mold 12, a neck ring 13, a blow core assembly 14, a stretch rod 16, and a heating element 18. The blow mold 12 further includes at least a base mold 12' and a body mold 12". While the machine itself will have other stations and components, those are conventional in nature and need only be briefly discussed below.

Two styles of blow molding machines exist, one-step machines and two-step machines. The difference between them is that in a one-step machine, a plastic preform is both injection molded and blow molded while in a two-step machine, an already formed plastic preform is fed into the machine and then blow molded. Each machine includes various stations. The number and type of these stations will differ from machine to machine. Generally, the stations may include either a preform injection molding station or a preform infeed station, a preform conditioning station, a blow mold station and a bottle outtake station. The present invention particularly involves the use of the blow molding station 10 of either a one or two-step machine. As such, only the blow molding station 10 is described in detail.

The blow mold 12 itself includes two separable halves (hydraulically, pneumatically, or mechanically controlled, the actuators not being shown) that cooperate to define a mold cavity 20 having sidewall surfaces 17 and base surfaces 19, which functions to receive a plastic preform 22 conditioned for blow molding. The blow mold 12 is made from appropriate materials, such as steel, to withstand and to hold temperatures of about 50–250° C., typically 130–170° C. The mold cavity 20 is designed with an appropriate shape to ultimately define the contours of the exterior surface of the desired plastic container.

The neck ring 13 (also hydraulically, pneumatically, or mechanically actuated, the actuators not being shown) is located adjacent the blow mold 12 and adapted to receive, hold and position the plastic preform 22 in an appropriate location relative to the mold cavity 20 during the blow molding and heat setting processes. To accomplish this function, the neck ring 13 defines an annular receiving cavity 28 of a shape and size to receive the neck of the plastic preform 22.

The blow core assembly 14 engages the top of the plastic preform 22 to allow for the injection of a fluid medium into the plastic preform 22. To accomplish this function, the blow core assembly 14 includes a blow core manifold 15 to which is mounted, in a conventional manner, a blow seal 31. The blow seal 31 defines an annular channel 32 that communicates with a first inlet port 24 and a second inlet port 26, as further discussed below. The neck ring 13, as well as the blow core manifold 15 and the blow seal 31, are all made from a strong material, such as steel.

Figure 2:
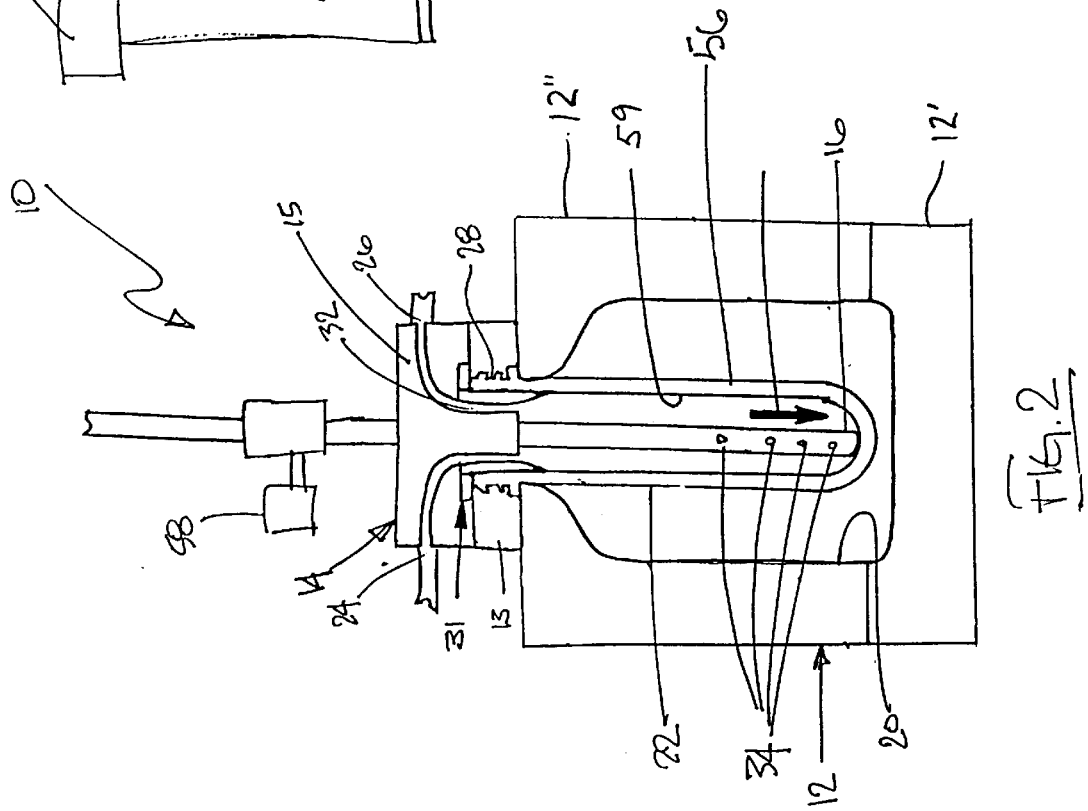

The stretch rod 16, also a part of the blow core assembly 14, extends generally through the center of the blow core manifold 15 and is movable from a retracted position, as shown in FIG. 1, to an extended position, as shown in FIG. 2. The stretch rod 16 functions to stretch the plastic preform 22 along a longitudinal axis and to induce axial orientation into the plastic material of the plastic preform 22. The stretch rod 16 preferably includes several exhaust ports 34. The exhaust ports 34 function to exhaust fluids from the plastic preform 22, as further explained below. The exhaust ports 34 communicate with a channel 35 inside the stretch rod 16 to convey the fluids to an exhaust area (not shown). The stretch rod 16 is made from a strong material, such as steel.

Figure 3:
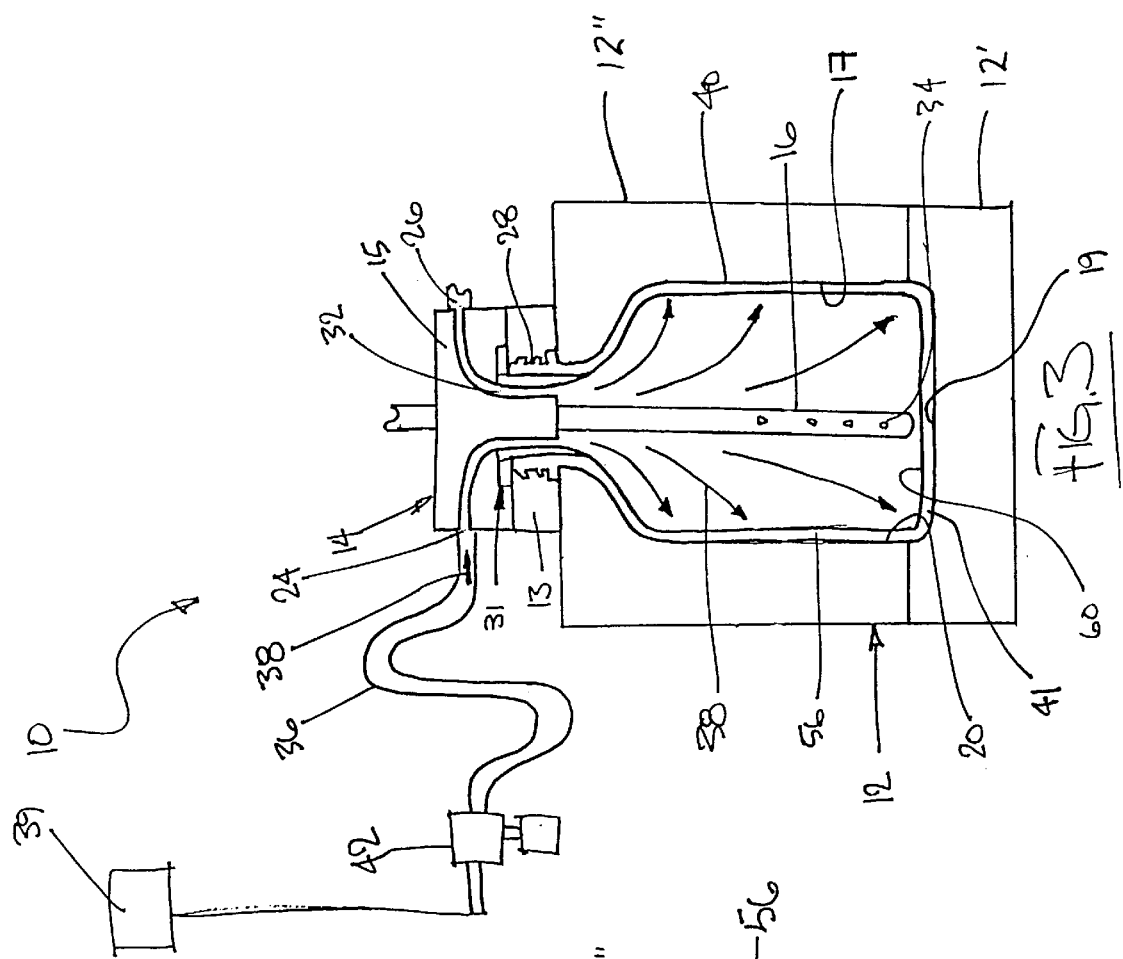

As shown in FIGS. 1 and 3, the first inlet port 24 is connected to a high-pressure conduit 36, which supplies a high-pressure fluid 38 from a high-pressure fluid source 39. The high-pressure fluid 38 functions to expand the plastic preform 22 into conformity with the sidewall surfaces 17 and the base surfaces 19, and to thereby form a biaxially oriented plastic container 40 having a sidewall 56 and a base 41 in a process commonly referred to as blow molding. A control valve 42 controls the flow of the high-pressure fluid 38. The control valve 42 may be either manually or electronically controlled, but is preferably automatically and systematically controlled by a system controller 43, as further explained below. The high-pressure conduit 36 is made from a flexible material, which permits movement and retraction of the blow core assembly 14 as it engages and disengages during the blow molding process.

Figure 4:
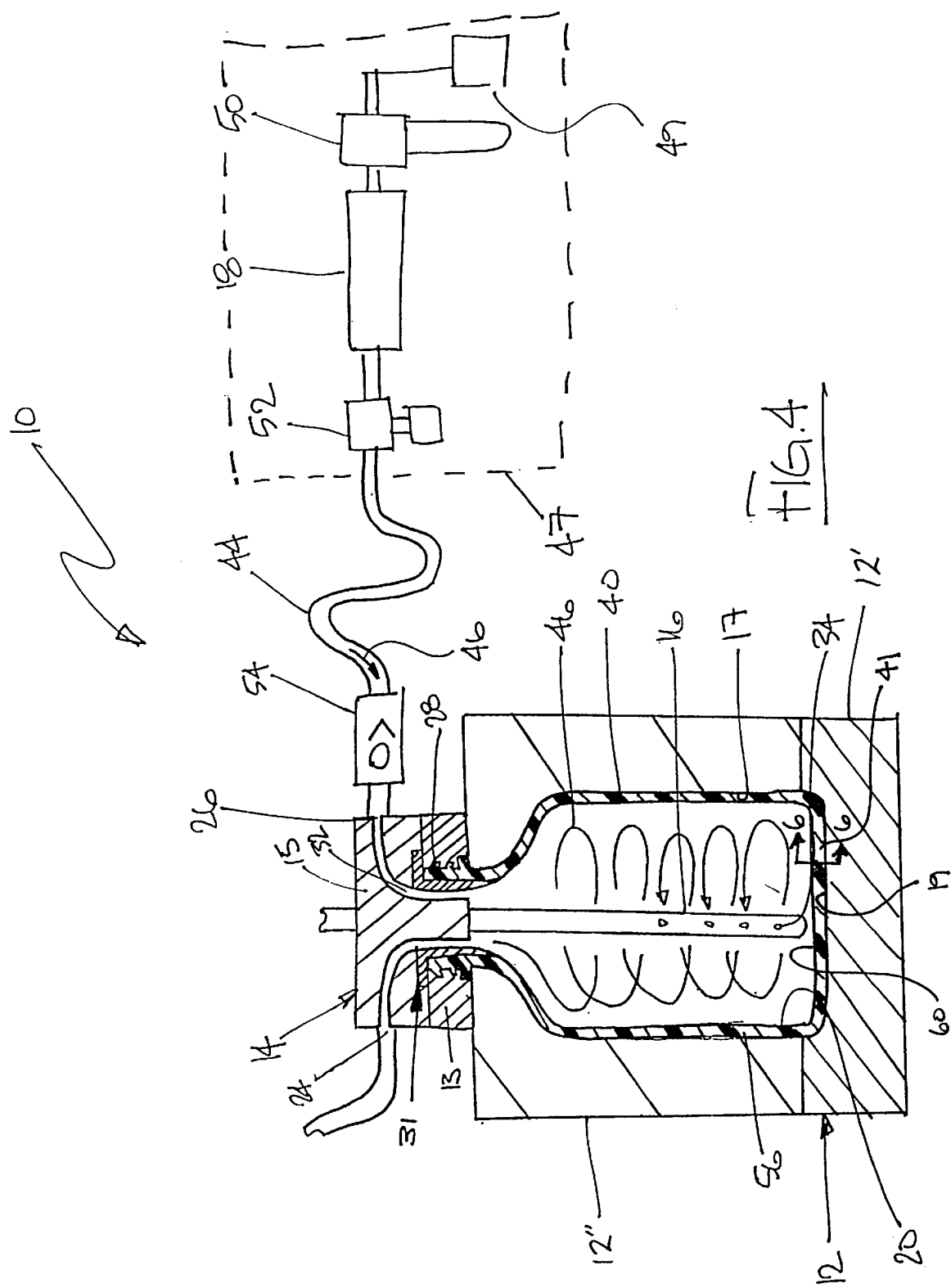

As shown in FIGS. 1 and 4, the second inlet port 26 is connected to a high-temperature conduit 44, which supplies a high-temperature fluid 46 from a high-temperature fluid source 47. The high-temperature fluid 46 functions to heat set the plastic container 40, through a convection heat transfer, and to thereby form a biaxially oriented, heat set plastic container 40. The term "convection heat transfer" is defined as the transfer of heat from a fluid to a solid, by way of the fluid flowing over or near the surface of the solid. "Convection heat transfer" actually includes both a conductive heat transfer and a convection heat transfer, but the combination of these two heat transfers is commonly referred to as simply "convection heat transfer." The high-temperature fluid 46 may include air, steam, water, or any other fluid capable of transferring heat energy to the plastic container 40.

To supply the high-temperature fluid 46, a fluid from a fluid source 49 is passed through a filter 50 and the heating element 18. The heating element 18 may be one of a well-known variety, such as an electrical resistance heater, which may contain a ferrous alloy wound around a ceramic rod (not shown). A person of ordinary skill in the art will readily appreciate the various types of filters and heating elements capable of being used with the invention to produce the desired effects. The heating element 18 is preferably small in size and high in intensity to heat the fluid from ambient air temperature to roughly the 370° C. temperature of the high-temperature fluid 46.

Located between the heating element 18 and the second inlet port 26 is a control valve 52 and a check valve 54. Like the control valve 42, the control valve 52 controls the flow of the high-temperature fluid 46 and may be either manually or electronically controlled. The control valve 52 is preferably automatically and systematically controlled by the system controller 43, as further explained below. The check valve 54 functions to prevent the high-pressure fluid 38 from traveling through the second inlet port 26 and into the high-temperature conduit 44. A person of ordinary skill in the art will readily appreciate the appropriate control valves and check valves.

The method of the present invention for producing a biaxially oriented, heat set plastic container having a base 41 with a high crystallinity generally includes a blow molding process and a heat setting process. The blow molding process includes providing a properly conditioned plastic preform 22 in the mold cavity 20 of the blow mold 12 and closing the blow mold 12. The plastic preform 22 is preferably made from PET, but may be made from other crystallizable materials. The blow core assembly 14 is next lowered into the plastic preform 22 such that a collar 33 of the blow seal is positioned interiorly of the finish or neck of the plastic preform 22 and a flange 37 engages the top of the plastic preform 22, as shown in FIG. 1. The stretch rod 16 is then moved by the actuator from its retracted position to its extended position, as shown in FIG. 2. This extension of the stretch rod 16 into the plastic preform 22 axially stretches the sidewall 56 of the plastic preform 22, and triggers the start of the fluid cycle.

The fluid cycle includes the opening and closing of the control valves 42 and 52 and a control valve 58, to blow mold the plastic preform 22 and to circulate the high-temperature fluid 46 over an interior surface 59 of the plastic preform 22, as shown in FIGS. 2–4. The extension of the stretch rod 16 starts the fluid cycle at time=$t_0$, as shown in FIG. 5. After the time delay 62 from time=$t_0$ to time=$t_1$, the control valve 52 is opened and the high-temperature fluid 46 is injected through the second inlet port 26, through the annular channel 32, and into the plastic preform 22. The pre-blow stage 64 occurs during stretching of the plastic preform 22 and operates to keep the stretching plastic preform 22 from contacting the stretch rod 16. The pre-blow stage 64 is in preparation for the blow molding process 66 and is of relatively short duration. At time=$t_2$, the control valve 42 is opened and the high-pressure fluid 38 is injected through the first inlet port 24, through the annular channel 32, and into the plastic preform 22. This blow molding process 66 occurs when the plastic preform 22 is pinned against the bottom of the blow mold 12 by the stretch rod 16. As the high-pressure fluid 38 is injected into the plastic preform 22, while the high-temperature fluid 46 is not turned off via the control valve 52, the high-pressure fluid 38 causes the check valve 54 to close, effectively shutting off the high-temperature fluid 46, as shown by the dashed lines in FIG. 5. The high-pressure fluid 38, which is preferably at a pressure of 3500 to 4200 kPa, inflates and expands the plastic preform 22 into conformity with the sidewall surfaces 17 and the base surfaces 19. As the plastic preform 22 is stretched and expanded, it forms the biaxially oriented plastic container 40 having a sidewall 56 and a base 41. Throughout the blow molding process 66, the sidewall surfaces 17 of the blow mold 12 are held at a temperature of around 120–250° C., preferably 130–170° C., while the base surfaces 19 of the blow mold 12 are held at a temperature of around 50–250° C., preferably 120–250° C.

Once the plastic container 40 has been fully stretched and expanded, at time=$t_3$, the control valve 58 is opened and the control valve 42 is closed, while the control valve 52 remains open. During the circulation process 68, the high-pressure fluid is exhausted through the exhaust ports 34 of the stretch rod 16. More importantly, the control valve 52 and the control valve 58 cooperate to circulate the high-temperature fluid 46 over an interior surface 60 of the base 41 of the plastic container 40. The high-temperature fluid 46 exhausts through the exhaust ports 34, through the channel 35 in the stretch rod 16, past the control valve 58, and into the exhaust area (not shown). The high-temperature fluid 46 may be recycled through the filter 50 and the heating element 18 to conserve energy.

The high-temperature fluid 46 is circulated over the interior surface 60 of the base 41 of the plastic container 40 for a sufficient duration to allow the interior surface 60 of the base 41 of the plastic container 40 to reach a temperature of at least 120° C. Thus, the crystallinity of the base 41 of the plastic container 40 is also induced through thermal processing by applying heat from an interior portion of the plastic container 40 to the interior surface 60 of the base 41 of the plastic container 40. The duration will depend on the composition of the high-temperature fluid 46, the temperature and pressure of the high-temperature fluid 46, and the flow rate of the high-temperature fluid 46 over the interior surface 60. In the preferred method, the high-temperature fluid 46 is air, at a temperature between 200 to 400° C., preferably 285 to 370° C., and at a pressure typically between 700 to 2100 kPa, preferably 1750 to 2100 kPa, but pressures up to 4200 kPa may be used. Other fluids, such as steam, may be used, as well as higher temperatures and pressures. At the preferred values, the high-temperature fluid 46 is circulated over the interior surface 60 of the base 41 of the plastic container 40 for 1 to 15 seconds, preferably 3 to 7 seconds, in order to transfer the necessary heat energy and in order to induce the appropriate amount of crystallinity into the plastic container 40.

Thus, the crystallinity of the base 41 of the plastic container 40 is induced through thermal processing by applying heat externally from the base surfaces 19 of the mold cavity 20 to the base 41 of the plastic container 40 and internally from the circulation of the high temperature air.

After the conclusion of the circulation process 68, at time=$t_4$, the control valve 52 is closed and the control valve 42 is opened. During the cooling process 70, the cooler high-pressure fluid 38 is circulated over the interior surface 60 to reduce the temperature of the plastic container 40. The temperature of the plastic container 40 must be reduced to a temperature that allows the plastic container 40 to be removed from the mold cavity 20 without any shrinkage or other deformation. After the cooling process 70, the control valve 42 is closed and shortly thereafter, as the final stage 72, the high-pressure fluid 38 is exhausted, the control valve 58 is closed, the mold cavity 20 is opened, and the plastic container 40 is removed. This entire process is then repeated for the subsequent production of further plastic containers. Since the entire process can be completed in a short amount of time, the process provides an efficient and inexpensive method for producing plastic containers having a base 41 with a high crystallinity, which allows the plastic containers to maintain their material integrity during any subsequent hot fill processes, and during shipment and use.

Using the method of the invention, the plastic container 40 can be produced having a base 41 with an average density greater than 1.367 g/cc. This average density roughly corresponds to a 30% crystallinity and will allow the plastic containers 40 to maintain its material integrity during subsequent hot fill processes, and during shipment and use of the plastic containers 40. As used herein, crystallinities greater than 30% are considered "high crystallinities". Other average densities greater than 1.367 g/cc, including 1.375 g/cc (roughly corresponding to 34.4% crystallinity), 1.38 g/cc (roughly corresponding to 38.5% crystallinity), 1.385 g/cc (roughly corresponding to 42.6% crystallinity), and even 1.39 g/cc (roughly corresponding to 46.7% crystallinity) are possible with the method of the present invention and without significantly impacting the visually perceptible transparency or clarity of the base 41 of the plastic containers 40.

Figure 6A:
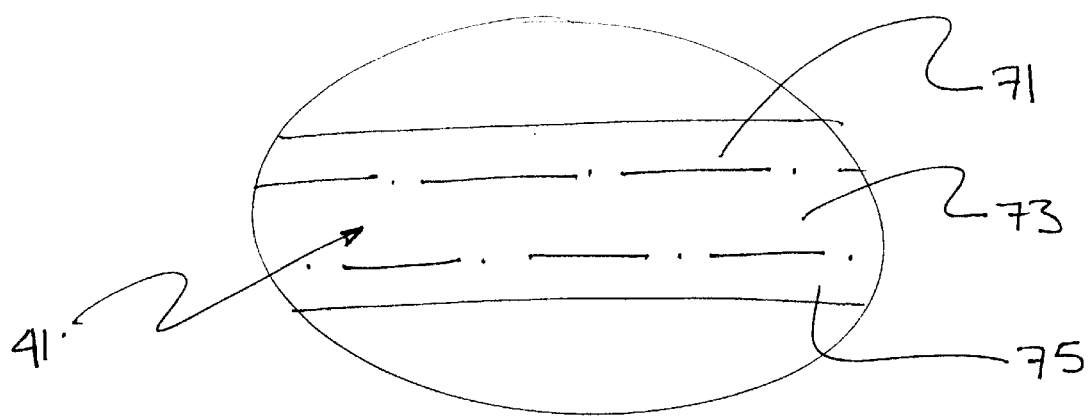
FIGS. 6A and 6B are cross-sectional views, taken along the line 6—6 of FIG. 4, of a portion of the base producable by the blow molding method of the present invention.
Figure 6B:
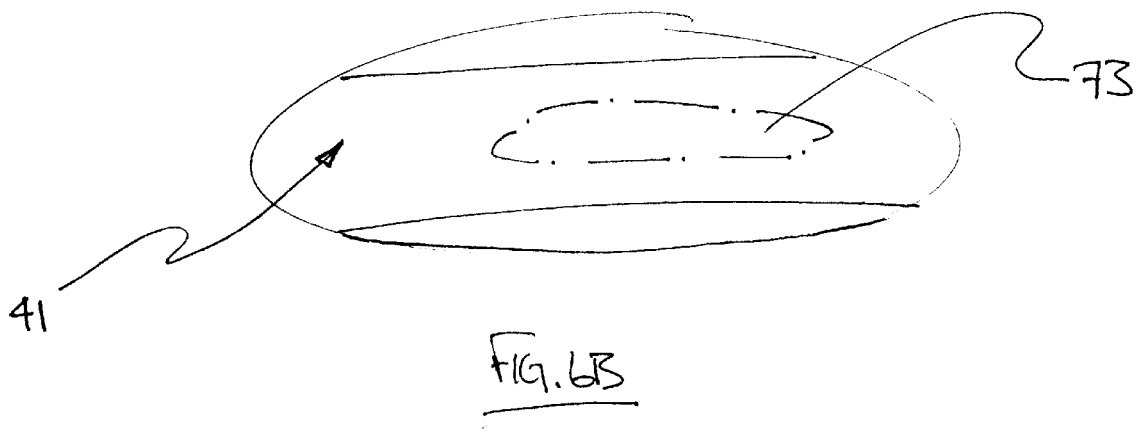

As shown in FIG. 6, the plastic container 40 may be produced having a portion of the base 41 with an inner layer 71 with an inner density, a middle layer 73 with a middle density, and an outer layer 75 with an outer density. The middle layer 73, which is not directly affected by the application of heat from the base surfaces of the mold cavity or from the interior portion of the plastic container, may be as narrow as 1% of the base 41, or as wide as 98% of the base 41. The middle layer is preferably approximately 15–50% of the thickness of the portion of the base 41. The middle layer 73 may also be located within the base 41 as a discrete pocket, as shown in FIG. 6B. The middle density is less than the outer density and the inner density by at least 0.005 g/cc and, more preferably, by at least 0.01 g/cc.

Figure 7:
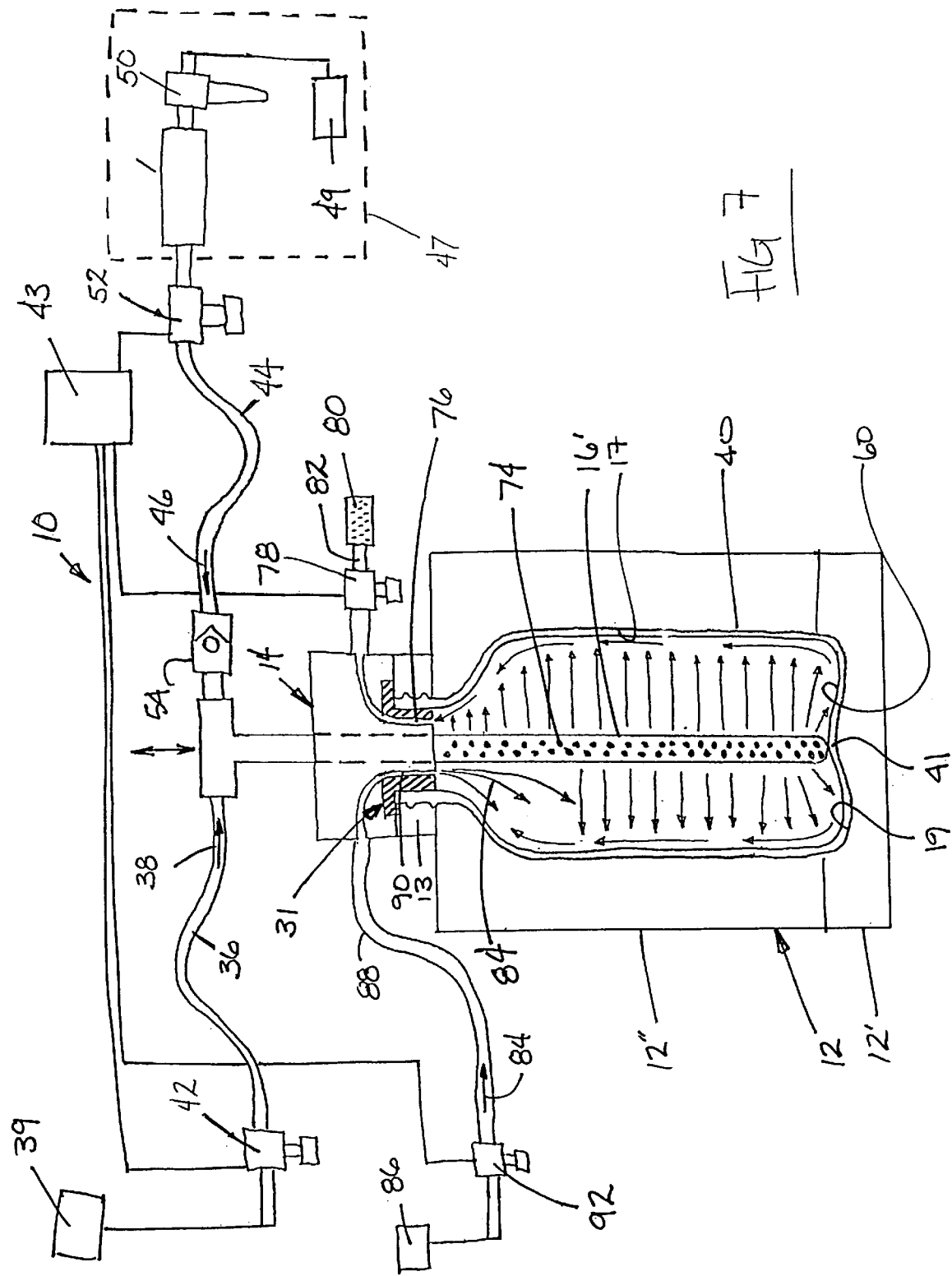
FIG. 7 is a schematic cross-sectional view of a portion of another embodiment of the blow molding machine.

As shown in FIG. 7, an alternative embodiment of the invention is particularly adaptable to multi-cavity machines, which have more than one mold cavity where stretching and blowing occurs simultaneously. In this embodiment, the high-temperature fluid 46 and the high-pressure fluid 38 are provided as in the first embodiment (and therefore attention is directed to the discussion above regarding the same) except that they communicate through the stretch/blow rod 16'. Located along the length of a stretch/blow rod 16' are a large number of small diameter blow ports 74, preferably all of the same diameter. The ports 74 direct the high-temperature fluid 46 to the interior surface of the plastic preform and direct the high-pressure fluid 38 to the interior surface 60 of the base 41 of the plastic container 40. The consistent and small diameter of the ports 74 enhances the velocity at which the fluids are introduced and further allows for a more even discharge of the fluids along the length of the stretch/blow rod 16'.

Exhausting of the high-temperature fluid 46 and the high-pressure fluid 38 is accomplished through a channel 76 formed within the blow seal 31. An exhaust valve 78, controlled by the system controller 43, is opened when necessary during the blow molding process. A muffler or silencer 80 may be mounted at the end of the exhaust line 82 to reduce noise during exhausting.

Another variance from the first embodiment is that the pre-blow fluid is no longer provided through the high-temperature fluid 46. Instead, a low pressure, low temperature fluid 84 is provided from a source 86 through a line 88 and into the plastic preform 22 through a channel 90, also formed in the blow seal 31. As shown in FIG. 7, the pre-blow fluid 84, preferably air at ambient temperature and at about 1400 kPa, is provided by the opening of a control valve 92 by the system controller 43 during advancement of the stretch/blow rod 16' and stretching of the plastic preform 22. For maximum control of the pre-blow fluid 84, one control valve 92 is used for each mold cavity of the machine 10.

As shown in FIG. 8, at time=$t_1$, the control valve 92 is opened and pre-blow fluid 84 is injected through the channel 90 into the plastic preform 22. This pre-blow stage 64' occurs during stretching of the plastic preform 22 and operates to keep the plastic preform 22 from contacting the stretch/blow rod 16'. At time=$t_2$, the control valve 92 is closed and the control valve 42 is opened to inject the high-pressure fluid 38 through the stretch/blow rod 16' and to inflate and expand the plastic preform 22 into conformity with the sidewall surfaces 17 and the base surfaces 19 thereby forming the plastic container 40 having a sidewall 56 and a base 41. At time=$t_3$, the control valve 42 is closed.

Preferably, at sometime between time=$t_1$ and time=$t_3$, the control valve 52 is opened by the system controller 43. In this manner, when the control valve 42 is closed at time=$t_3$, the high-temperature fluid 46 immediately flows through the ports 74 and is directed at the interior surface 60 of the base 41 of the plastic container 40.

The remainder of the process sequence is as described above and reference should be made to that portion of this description.

The foregoing discussion discloses and describes a preferred embodiment of the present invention. One skilled in the art will readily recognize from such discussion, and from the accompanying drawings and claims, that changes and modifications can be made to the invention, including varying the timing sequence, without departing from the true spirit and fair scope of the invention as defined in the following claims.

We claim:

1. A method of producing a heat set plastic container comprising the steps of:

providing a mold cavity having sidewall surfaces and base surfaces;

providing a plastic preform within said mold cavity;

expanding and stretching said preform into conformity with said sidewall surfaces and said base surfaces to form the plastic container having a sidewall and a base; and inducing crystallinity in said base of the plastic container by applying heat from said base surfaces of said mold cavity to said base of the plastic container and by applying heat from an interior portion of the plastic container to an interior surface of said base of the plastic container, wherein said applying heat from said interior portion of the plastic container includes circulating a high-temperature fluid at a pressure in the range of 700 to 4200 kPa through said interior portion of the plastic container.

2. The method of claim 1 wherein said applying heat from an interior portion of the plastic container includes using convection heat transfer.

3. The method of claim 1 wherein said circulating a high-temperature fluid includes circulating air.

4. The method of claim 1 wherein said circulating a high-temperature fluid includes circulating a fluid with a temperature in the range of 200° C. to 400° C.

5. The method of claim 1 wherein said circulating a high-temperature fluid includes circulating a fluid for a duration in the range of 1 second to 15 seconds.

6. The method of claim 1 wherein said circulating a high-temperature fluid includes circulating a fluid into and out of the interior portion of the plastic container.

7. The method of claim 1 wherein said circulating a high-temperature fluid includes introducing a high-temperature fluid into the plastic container while also exhausting said high-temperature fluid from the plastic container.

8. The method of claim 9 wherein said introducing a high-temperature fluid occurs simultaneously with said exhausting said high-temperature fluid.

9. The method of claim 1 wherein said circulating a high-temperature fluid includes directing a fluid toward said interior surface of said base of the plastic container.

10. The method of claim 1 wherein said applying heat from said base surfaces of said mold cavity includes providing said base surfaces with a temperature in the range of 50° C. to 250° C.

11. The method of claim 10 wherein said providing said base surfaces includes providing said base surfaces with a temperature in the range of 120° C. to 250° C.

12. The method of claim 1 wherein said inducing crystallinity includes inducing crystallinity to produce a plastic container having a base with an average density in the range of 1.367 g/cc to 1.40 g/cc.

* * * * *